UNITED STATES PATENT OFFICE.

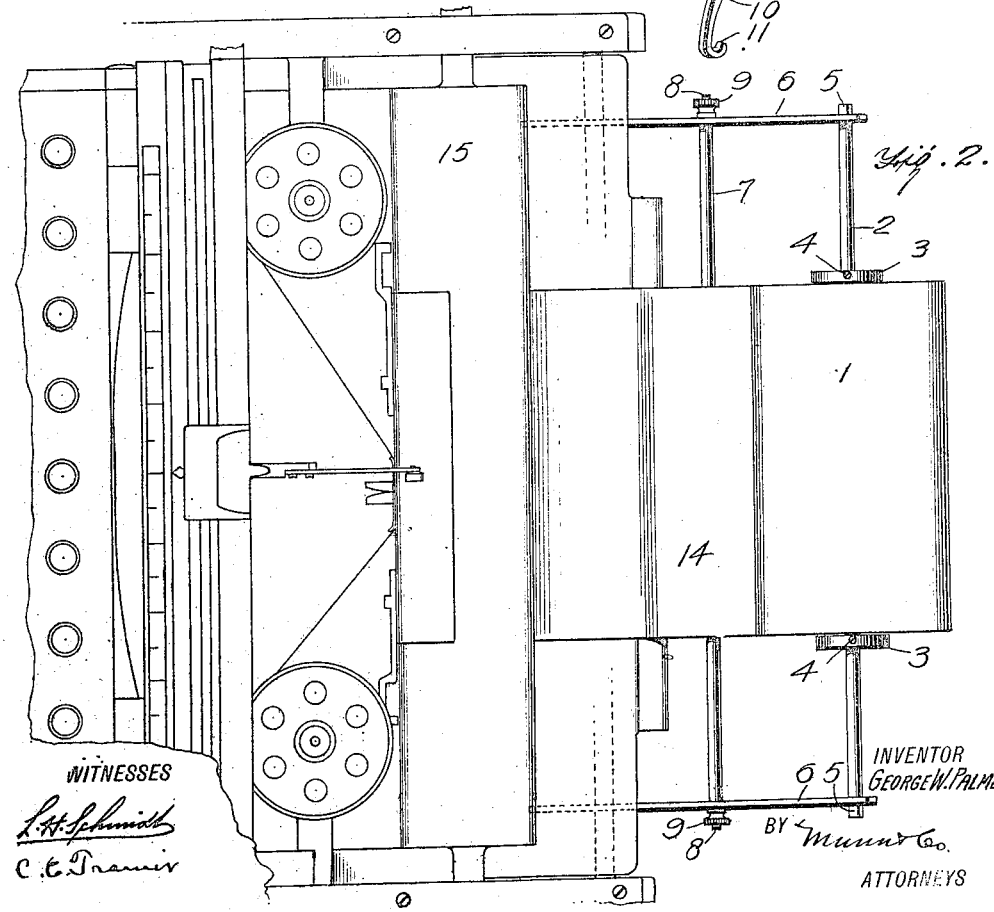

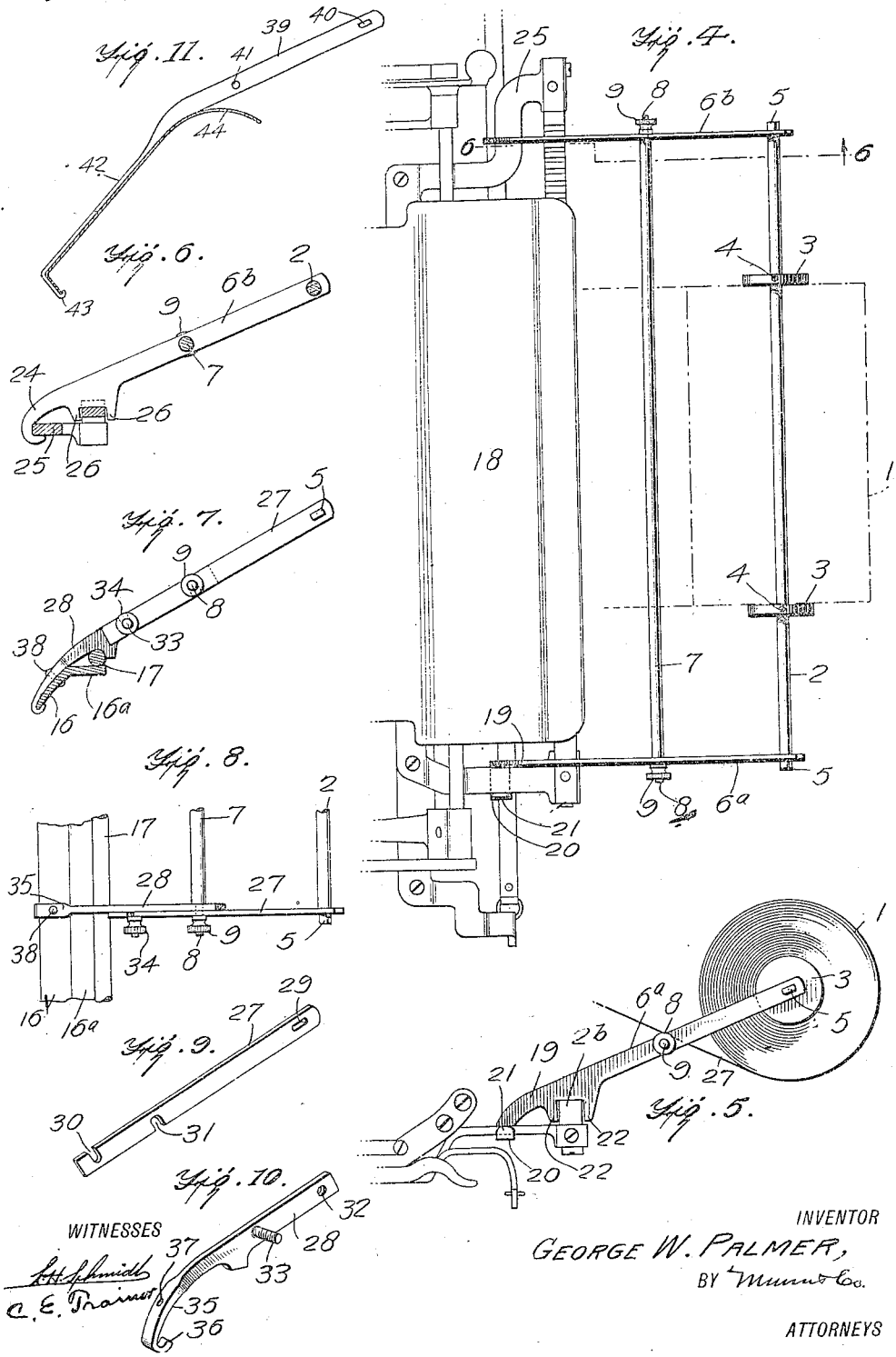

GEORGE WESTGATE PALMER, OF SEATTLE, WASHINGTON.

TYPE-WRITER ATTACHMENT.

1,139,367.  Specification of Letters Patent.  Patented May 11, 1915.

Application filed May 28, 1914. Serial No. 841,492.

*To all whom it may concern:*

Be it known that I, GEORGE W. PALMER, a citizen of the United States, and a resident of Seattle, in the county of King and State of Washington, have invented a new and useful Improvement in Type-Writer Attachments, of which the following is a specification.

My invention is an improvement in typewriter attachments, and has for its object to provide an attachment capable of quick connection to a typewriter or detachment therefrom for supporting a roll of gummed or plain paper for receiving addresses, and designed for attachment to envelops, circulars and the like, or for receiving notes, memoranda or the like, and so arranged that the strip may be withdrawn for use from the roll by the turning of the platen roll.

In the drawings:—Figure 1 is a side view of the attachment in place, Fig. 2 is a top plan view, Fig. 3 is a perspective view of one end of the supporting frame, Fig. 4 is a view similar to Fig. 2, with the roll of paper removed, Fig. 5 is a side view of the attachment applied to the Remington typewriter, Fig. 6 is a section on the line 6—6 of Fig. 4, Fig. 7 is an end view of a modified construction, Fig. 8 is a plan view of Fig. 7, Fig. 9 is a perspective view of a modified form of side bar or plate, Fig. 10 is a perspective view of a portion of Fig. 7, and Fig. 11 is a sectional view of a modified construction.

In the embodiment of the invention shown in Figs. 1 to 3, the roll 1 of paper gummed on one side is supported on a roller, not shown, which is journaled on a shaft 2, and collars 3 are arranged at each end of the roller on the shaft, for defining the position of the roller on the shaft. Each of the collars is provided with a set screw 4, for fixing the collar with respect to the shaft, and it will be evident that by loosening the set screws the collar and the gummed paper may be placed at any desired point on the shaft.

The ends of the shaft 2 are reduced and flattened as shown at 5, and are received in similarly shaped slots in ends of supporting plates 6. A second shaft 7 is supported by the plates parallel with the shaft 2, the ends of the shaft being reduced and threaded as shown at 8, and passed through openings in the plates, the threaded ends which extend beyond the plates being engaged by nuts 9, to secure the parts in position.

The opposite end of each of the plates 6 from the shaft 2 is arc-shaped as shown at 10, the convex edge of the said portions being upward, and each of the said portions is provided with a hook 11, at the end remote from the shaft 2. Each plate is provided with a depending stop 12 at the junction of the curved portion with the body of the plate, and the ends of the plates remote from the shaft 2 are designed to engage a portion of the typewriter 13, for supporting the roll 1 of gummed paper in rear and above the typewriter.

The above construction is for the purpose of connecting the roll to the Underwood typewriter, and the roll is so held that the strip 14 of paper will pass from the under side of the roll 1 over the shaft or roller 7, and beneath the platen roll 15. The hook 11 of each of the plates engages the lower edge of an angle plate 16—16$^a$, which is a part of the typewriter. This plate is shown in section in Fig. 7, in connection with a modified form of supporting plate.

It will be noted that a shaft 17 extends just above the horizontal portion 16$^a$ of the plate and that the said shaft engages in a notch or recess 12$^a$ immediately in front of the stop 12. The roller supporting the roll of gummed paper is free to rotate on the shaft 2, and it will be evident that when the platen roll 15 is turned in the usual manner, the gummed paper will be drawn over the front of the platen roll in position to receive the printed matter.

In Figs. 4, 5 and 6, the attachment is shown arranged to be connected with a Remington machine 10. With this construction the shaft 2 supporting the paper roll and provided with the collars 3, having the set screws 4, is connected with plates 6$^a$ and 6$^b$, the reduced flattened ends 5 of the shaft 2 being received in similarly shaped slots at one end of the plates.

The shaft or roller 7 is connected with the plate 6$^a$ in the same manner as it is connected with the plates 6, the reduced threaded ends 8 being passed through openings in the plate and engaged by nuts 9 outside the plates. The plate 6$^a$ is provided at its front end with an arc-shaped portion 19, arranged with its convex edge upward and at the front end of the said portion 19, a lateral outwardly extending lug 20 is provided, having at the end remote from the arc-shaped portion an upwardly extending lug 21. The plate 6ᵃ is also provided at the junction of the arc-shaped portion and the body of the plate with a pair of depending lugs 22, the said lugs being spaced apart from each other longitudinally of the plate. The lugs 22 engage opposite sides of the tabulating bar 23 of the machine, and the lug 20 engages beneath the adjacent support for the said bar with the lug 21 at the opposite edge of the support from the arc-shaped portion of the plate.

The plate 6ᵇ as shown in Fig. 6, is provided at the end remote from the shaft 2 with a hook 24, which engages beneath that portion of the adjacent support 25 for the tabulating bar, which extends parallel with the said bar. At the tabulating bar the plate is provided with a pair of longitudinally spaced depending lugs 26, for engaging opposite sides of the bar. Thus the roll on the shaft 2 is supported in the same manner as it is supported on the Underwood typewriter as shown in Figs. 1 and 2 in such position that the strip 27 from the roll will pass over the shaft 7 and the paper guard to the platen roll.

The plates 6 shown in Figs. 1, 2 and 3, and designed for the general class of typewriters, may be either a single plate as shown in the said figures or a sectional plate as shown in Figs. 7, 8, 9 and 10. The plates shown in Figs. 7, 8, 9 and 10, consist of sections 27 and 28, lapped upon each other and detachably connected together. The section 27 of the plate has a longitudinal slot 29, for receiving one of the flattened ends of the shaft 2, and at its opposite end the plate is provided with notches 30 and 31.

The notch 30 is at the end of the section remote from the slot 29, while the notch 31 is spaced apart from the notch 30. The notch 30 is in the upper edge of the section, while the notch 31 is in the lower edge. The section 28 is provided at one end with an opening 32, adapted to register with the slot 31, for receiving the reduced end 8 of the shaft or roller 7, and the nut 9 when threaded on to the reduced end will clamp the end of the section 28 and the section 27 against the annular shoulder formed between the body of the shaft and the reduced portion.

The section 28 is also provided with a laterally extending threaded stem 33, which engages the notch 30 of the section 27, and a nut 34 is threaded on to the stem on the opposite side of the section 27 from the section 28 to clamp the sections together at this point. The section 28 is provided with the arc-shaped portion 35, corresponding to the portion 10 of the construction shown in Figs. 1 to 3, and the said portion is arranged with its convex face upwardly. The arc-shaped portion 35 is also provided with a hook 36, corresponding to the hook 11 of the plate 6, and adapted to engage the plate 16—16ᵃ in the manner above described.

It will be noted that at the arc-shaped portion 35, the plate is widened and an opening 37 is provided at this point for receiving a screw or rivet 38. The screw or rivet 38 passes through the opening 37 and through a registering opening in the portion 16 of the plate to rigidly secure the section 28 of the plate to the typewriter carriage. When the sectional plates 27—28 are used, the attachment may be disconnected from the typewriter carriage, merely by loosening the nuts 9 and 38, to permit the detachment of the sections 27 and 28. The section 28 of each plate is left in place on the carriage.

The improved attachment consists of the shaft for supporting the roll of paper, and the means for attaching the shaft to the carriage of the typewriter, and it is obvious that the roll might be mounted directly on the shaft as indicated in Fig. 4, the roll being held by the collars 3. The frame consists of the connected plates having means for engaging the carriage of the typewriter and having also means for engagement by the shaft, to support the shaft. When a roll of paper is exhausted the shaft may be removed, by loosening the nuts 9, and disengaging the ends of the shaft from the slots. The plates 6—6ᵃ—6ᵇ and the section 27 of the plate 27—28 may be resilient, if desired, so that the ends of the shaft may be sprung out.

The form of holding plate shown in Fig. 11 is designed for use with the L. C. Smith typewriter, and this form of plate is also used with the Monarch typewriter. The plate 39 is provided with the openings 40 and 41 for the shafts 2 and 7, and each of the said plates has an angular portion 42, which extends at an obtuse angle with respect to the body of the plate. At its lower end the portion 32 is provided with a hook 43 for engaging beneath the lower edge of the paper guide 44.

The operation of the improved attachment is as follows:—With the roll mounted as shown in Figs. 1, 2 and 5, and the gummed paper passed over the platen roll as indicated in Fig. 2, the address or whatever other matter desired, is written on the strip in the usual manner. It will be evident that by using the construction of plate shown in Figs. 7 to 10, inclusive, that portion of the attachment which carries the shaft 2 may be fitted to any typewriter, by adding the parts 28, which will most easily engage the typewriter. As for instance, in the construction of Fig. 4, the section 28 instead of being as shown in Fig. 10, might be as shown in Fig. 5, and connected to the portion 27 in the same manner.

That portion of the support consisting of the shafts 2 and 7 and the parts 27 of the supporting plates may be fitted to any typewriter merely by placing the properly formed section corresponding to the section 28. To place the attachment on the Number 5 Underwood typewriter, the carriage must be raised by pressing the shift key, after which the hooks 11 are inserted above the paper guide and moved forward until the bills of the hooks may be engaged beneath the lower edge of the paper guide plate. To release the attachment the carriage is raised as before stated, and the hooks are disengaged from the plate.

The principal uses for which the attachment is devised are for addressing envelops and for the use of telegraph operators. It is obvious however, that the device is also adapted for use in brokers'. offices, railroad offices or other offices for preparing long reports or for notes and memoranda and for addressing magazines, circulars, packages and the like.

In practice rolls of gummed paper would be furnished, arranged on wooden or paper cores, the cores having longitudinal openings for receiving the shaft 2. The strip of paper might be partially separated by transverse lines of perforation or the like into labels of suitable size. The labels would be of suitable width and after the addresses were written the labels would be applied by moistening the gummed surface. Where the improved paper is merely intended for notes, memoranda or long reports, it need not be gummed on the reverse side.

It is obvious that the addressing of envelops would be much simplified and that a great amount of waste would be eliminated, since no envelops would be destroyed. For the use of telegraph operators the telegraph blanks would be made up in rolls, the strip having transverse lines of partial separation for permitting the individual blanks to be torn off. The individual blanks might receive any desired advertising matter on both faces, as might also the address face of the labels. With gummed strips, however, the printed matter would be omitted on the under or gummed faces.

The improved attachment might also be used for providing copies of letters on a continuous strip. Letter heads might be inserted in the typewriter in the usual manner with the carbon placed in such manner that the letter would be repeated on the strip. A continuous record would thus be obtained of all of the letters written on each machine.

The rollers 3 form a species of brake for preventing the roll of paper from running off too freely. The extent of drag which they exert upon the paper may be varied by moving them closer to or farther away from the end of the roll. The weight of the attachment, as a whole, is not on the shift key. That is, while the attachment moves horizontally with the carriage of the typewriter it does not rise when the shift key is depressed.

I claim:

1. An attachment for typewriters, comprising a shaft adapted to support a strip of paper formed into a roll, the shaft having its ends reduced, collars on the shaft at each end of the roll, means for rigidly fixing each of the collars to the shaft, a pair of supporting plates, each of the said plates having in one end an opening for receiving a reduced end of the shaft, a guide shaft or roller arranged parallel with the paper supporting shaft and detachably connected at its ends to the plates, each plate having means at the end remote from the paper supporting shaft for engaging the carriage of a typewriter to support the roll of paper above and behind the carriage, said means comprising a hook for engaging the front edge of the paper guide plate, and depending lugs for engaging the opposite side edges of the tabulating bar.

2. An attachment for typewriters, comprising a shaft adapted to support a strip of paper formed into a roll, the shaft having its end reduced, collars on the shaft at each end of the roll, means for rigidly fixing each of the collars to the shaft, a pair of supporting plates, each of the said plates having in one end an opening for receiving a reduced end of the shaft, and a guide shaft or roller arranged parallel with the paper supporting shaft and detachably connected at its ends to the plates, each plate having a hook at the end remote from the paper supporting shaft for engaging beneath a portion of the carriage of a typewriter to support the roll of paper above and behind the carriage, said plates resting on the carriage intermediate their ends.

3. An attachment for typewriters, comprising a shaft adapted to support a roll of paper, stops on the shaft and adjustable to engage the ends of the roll, and a plate for connecting each end of the shaft to the carriage of a typewriter, each plate having a detachable connection with the shaft at one end, and having a hook at the other end for detachably engaging beneath a portion of the carriage, the plates engaging and resting on the carriage intermediate their ends.

GEORGE WESTGATE PALMER.

Witnesses:
  E. J. FREDELL,
  WALTER KEYS.